UNITED STATES PATENT OFFICE.

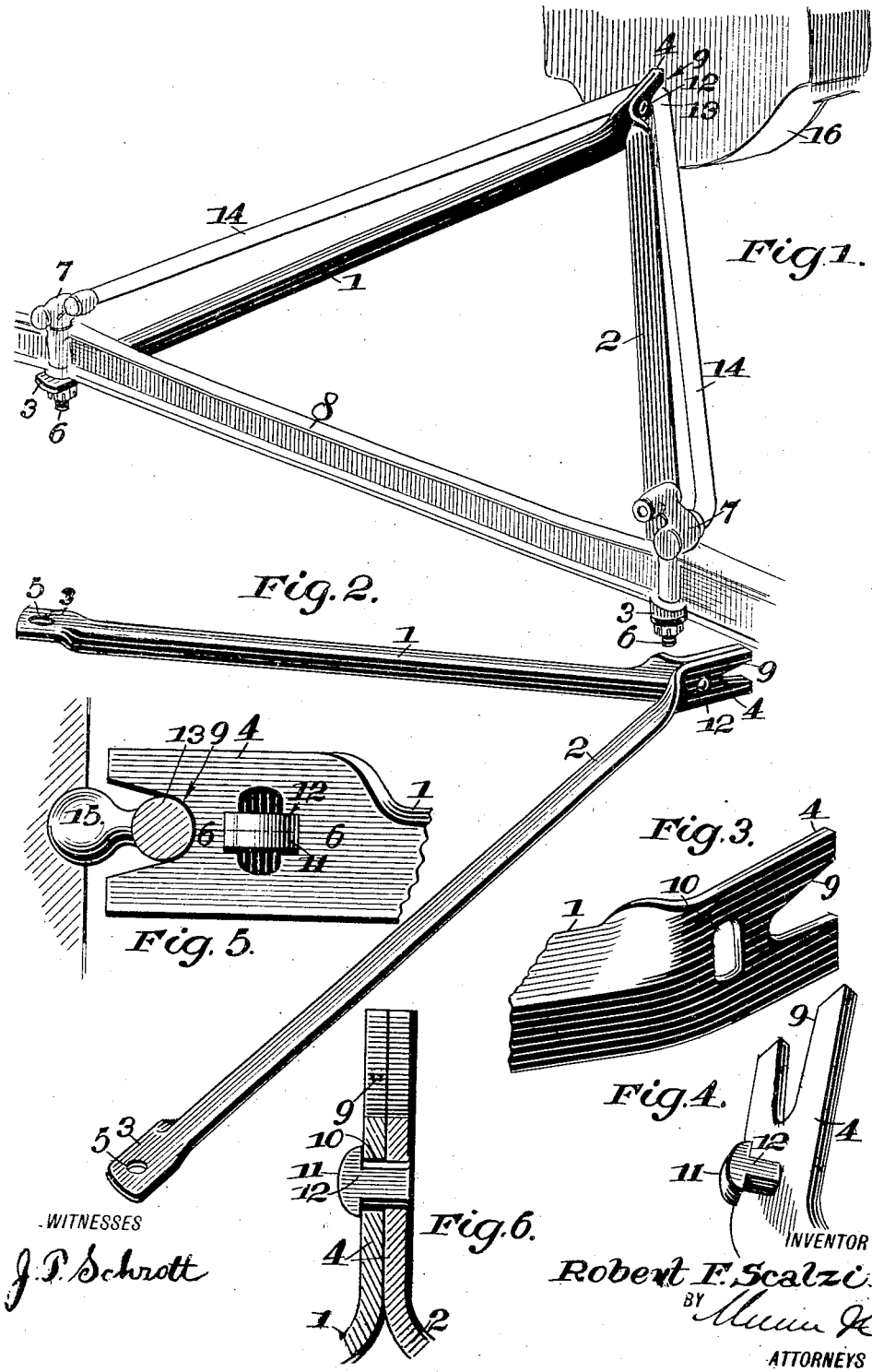

ROBERT F. SCALZI, OF TRENTON, NEW JERSEY.

RADIUS-ROD.

1,306,562.   Specification of Letters Patent.   Patented June 10, 1919.

Application filed March 27, 1919. Serial No. 285,602.

*To all whom it may concern:*

Be it known that I, ROBERT F. SCALZI, a citizen of the United States, and a resident of Trenton, in the county of Mercer and State of New Jersey, have invented certain new and useful Improvements in Radius-Rods, of which the following is a specification.

My invention relates to improvements in automobile frames, it being more particularly an improvement in the radius rods, and it consists in the constructions, combinations and arrangements herein described and claimed.

The foremost object of my invention is to provide an auxiliary radius rod, attachable either to automobiles of a well known type already in use, or to the same automobiles in the process of manufacture, providing a brace for the front axle in addition to the radius rods already in use, to prevent distortion of the front axle.

A further object of the invention is to provide auxiliary radius rods for the purpose described, which are normally separate to facilitate packing and shipping, and which are arranged for easy application to an automobile frame by simply fitting them together and giving them a slight turn to bring them into the relationship they assume when fitted to the frame.

Other objects and advantages will appear in the following specification, reference being had to the accompanying drawing, in which:

Figure 1 is a perspective view illustrating the application of the improved radius rods, Fig. 2 is a perspective view showing the improved radius rods separated from the automobile frame, Fig. 3 is a detail perspective view of one end of one of the radius rods, Fig. 4 is a detail perspective view of the companion end of the other radius rod, Fig. 5 is a detail sectional view showing how the forked head of the auxiliary radius rods is applied to the crotch of the radius rods already in place, and Fig. 6 is a detail section on the line 6—6 of Fig. 5.

In carrying out my invention I provide auxiliary radius rods 1 and 2, which are preferably made of angle iron, or any other suitable material, with flattened ends 3 in a horizontal plane at the front, and flattened ends 4 at the rear in a vertical plane.

The flattened ends 3 have holes 5 to receive the lower ends of bolts 6 which hold the spring knuckles 7 in place on the front axle 8. The rear ends 4 are notched at 9 to constitute a forked head as shown in Fig. 2, when fitted together.

A slot 10 in one end 4 receives the locking bolt 11 on the similarly flat end of the other radius rod. Ordinarily, as when the radius rods are packed for shipping, they are separate, but when it is desired to set them up for application to an automobile frame in the manner presently to be more fully described, the respective rods are positioned at right angles to each other, the locking stud or bolt 11 is fitted in the slot 10, and the rods are given a quarter turn to bring them into position.

It is to be observed that the locking stud or bolt 11 has flat sides 12. This enables the fitting of the locking stud into the vertically elongated slot 10. On giving the radius rods the quarter turn referred to, the shoulders of the head of the locking stud bear on the surfaces adjacent to the slot and lock the two parts together as shown in Fig. 5.

In applying the auxiliary radius rod to the automobile frame, the forked head is fitted over the crotch 13 of the radius rods 14 already in place. The construction and arrangement of these radius rods 14 will be recognized as that of a well known type of automobile. These radius rods include a ball joint 15 which fits in a suitable socket in the motor casing 16. The spring knuckle construction 7 is arranged to receive the forward ends of the radius rods 14 and thus in a measure rigidify the front axle.

Actual practice has demonstrated, however, that the front axle soon inclines inwardly from the bottom, that is to say, the strains on the supporting part are so great that the connection between the radius rods 14 and the front axle is not sufficiently strong to keep the axle in the true vertical position that it ought to assume always. By using my improved auxiliary radius rod, the axle is kept in the true vertical position and practically no amount of strain will twist the parts out of position.

In order to demonstrate that the front axle 8 is twisted out of position as explained above, it has been found that in instances where it was desired to apply the auxiliary radius rods to automobiles already in use, the front axle 8 had to be gripped with a powerful wrench and twisted forwardly from beneath far enough to bring the ends of the bolt 6 into alinement with the holes 5, thus showing that the connections between the radius rods 14 and the front axle are not strong enough to prevent the distortion of the axle.

While the construction and arrangement of the auxiliary radius rods is that of a generally preferred form, as herein described and claimed, obviously modifications and changes may be made without departing from the spirit of the invention or the scope of the claims.

I claim:—

1. Auxiliary automobile radius rods, comprising a pair of members normally separate to facilitate packing, provided with companion ends contacting in a vertical plane, including original radius rod crotch engaging means, and having interlocking means; and means including flattened portions at the other ends to be secured to the common securing means of said original radius rod.

2. Auxiliary radius rods comprising a pair of members normally separate to facilitate transportation, and including devices on companion ends, arranged to be fitted together by holding said members in certain relative positions, and then to be interlocked by moving said members into the finally set up position.

3. An auxiliary radius rod construction, comprising a pair of suitably constructed radius rod members terminating in notched ends providing a forked head for free application to the crotch of original radius rods, and provided with suitably formed portions at the other ends, for attachment to portions of the original radius rod securing means; and means releasably interlocking the ends constituting the forked head together, including an opening in one end and an insertible member on the companion end.

4. The combination, with an automobile axle, original radius rods including a crotch, with the ends suitably secured on top of the axle; of auxiliary radius rods applicable to the aforesaid combination to prevent backward twisting of the axle, comprising a pair of separable members merging into a head with a fork freely applicable to the crotch, and suitably formed ends arranged to be affixed to portions of the original radius rod securing means below said axle.

ROBERT F. SCALZI.

Witness:
HERVEY S. MOORE.